United States Patent
Ito

(10) Patent No.: US 8,441,900 B2
(45) Date of Patent: May 14, 2013

(54) OBJECTIVE LENS AND OPTICAL PICK-UP DEVICE USING THE SAME

(75) Inventor: Mitsuru Ito, Zama (JP)

(73) Assignees: SANYO Electric Co., Ltd., Moriguchi-shi (JP); SANYO Optec Design Co., Ltd., Tokyo (JP)

( * ) Notice: Subject to any disclaimer, the term of this patent is extended or adjusted under 35 U.S.C. 154(b) by 0 days.

(21) Appl. No.: 13/351,707

(22) Filed: Jan. 17, 2012

(65) Prior Publication Data

US 2012/0182847 A1   Jul. 19, 2012

(30) Foreign Application Priority Data

Jan. 17, 2011   (JP) ................................ 2011-006664

(51) Int. Cl.
   *G11B 7/00*   (2006.01)
(52) U.S. Cl.
   USPC ................... 369/44.23; 369/112.23; 359/558; 359/565; 359/569
(58) Field of Classification Search ............... 369/44.23, 369/112.12, 112.23; 359/558, 565, 569
   See application file for complete search history.

(56) References Cited

U.S. PATENT DOCUMENTS

| | | | | |
|---|---|---|---|---|
| 6,982,838 B2* | 1/2006 | Maruyama et al. | ........... | 359/719 |
| 7,239,598 B2* | 7/2007 | Maruyama et al. | ...... | 369/112.23 |
| 7,843,792 B2* | 11/2010 | Koreeda et al. | ......... | 369/112.23 |
| 2008/0019232 A1* | 1/2008 | Yoo et al. | ................... | 369/44.23 |
| 2009/0185472 A1* | 7/2009 | Koreeda et al. | .......... | 369/109.01 |
| 2010/0322059 A1* | 12/2010 | Yasui | ....................... | 369/112.03 |
| 2012/0207008 A1* | 8/2012 | Minami et al. | ........... | 369/112.23 |

FOREIGN PATENT DOCUMENTS

| JP | 9-69237 | 3/1997 |
|---|---|---|
| JP | 2003-45064 | 2/2003 |

* cited by examiner

*Primary Examiner* — Wayne Young
*Assistant Examiner* — Brenda Bernardi
(74) *Attorney, Agent, or Firm* — Morrison & Foerster LLP

(57) ABSTRACT

Provided is an objective lens that allows securing of a long working distance for a laser beam with a long wavelength and has a predetermined thickness or larger, and an optical pickup apparatus including the objective lens. In an objective lens of the present invention, a first region that focuses laser beams of a BD, DVD, and CD standards, a second region that focuses the laser beams of the DVD and CD standards, and a third region that focuses the laser beams of the BD and the DVD standards are provided in this order from a center portion of the objective lens. An optical super resolution with the laser beam of the BD standard is achieved by preventing a portion of the laser beam of the BD standard transmitted through the second region from contributing to spot formation.

8 Claims, 11 Drawing Sheets

| REGION | F1 | F2 | F3 | F4 | F5 | F6 |
|---|---|---|---|---|---|---|
| CORRESPONDING LASER BEAM | BD/DVD /CD | DVD/CD | BD/DVD | BD | DVD | BD |
| R (mm) | 0.000 ~0.5928 | 0.5928 ~0.932 | 0.932 ~1.013 | 1.013 ~1.08 | 1.08 ~1.200 | 1.200 ~1.510 |
| ANNULAR ZONE SHAPE | ╲ | ╲ | ╲ | — | — | — |
| NUMBER OF ANNULAR ZONES | 2 | 11 | 3 | 0 | 0 | 0 |

| REGION | BOUNDARY BETWEEN F1 AND F2 |
|---|---|
| ANNULAR ZONE SHAPE | ╲ |

| REGION | BOUNDARY BETWEEN F2 AND F3 |
|---|---|
| ANNULAR ZONE SHAPE | ╲ |

| REGION | F1 | F2 | F3 | F4 | F5 | F6 |
|---|---|---|---|---|---|---|
| CORRESPONDING LASER BEAM | BD/DVD/CD | DVD/CD | BD/DVD | BD | DVD | BD |
| R (mm) | 0.000 ~0.5928 | 0.5928 ~0.932 | 0.932 ~1.013 | 1.013 ~1.08 | 1.08 ~1.200 | 1.200 ~1.510 |
| ANNULAR ZONE SHAPE | ⌐ | ⌐⌐ | ⌐⌐⌐ | — | — | — |
| NUMBER OF ANNULAR ZONES | 2 | 11 | 3 | 0 | 0 | 0 |

| REGION | BOUNDARY BETWEEN F1 AND F2 | REGION | BOUNDARY BETWEEN F2 AND F3 |
|---|---|---|---|
| ANNULAR ZONE SHAPE | ⌐⌐ | ANNULAR ZONE SHAPE | ⌐⌐ |

FIG.6A

| SURFACE | CURVATURE RADIUS R(mm) | SURFACE INTERVAL d(mm) | REFRACTIVE INDEX n |
|---|---|---|---|
| (OBJECT DISTANCE) | – | ∞ | – |
| (STOP) | ∞ | 0 | – |
| 1(OPTICAL PICKUP LENS:SURFCE R1) | R1 | 1.57 | n1 |
| 2(OPTICAL PICKUP LENS:SURFCE R2) | R2 | d2 | – |
| 3(OPTICAL TRANSPARENT LAYER IN OPTICAL DISC) | ∞ | d3 | n2 |
| 4(OPTICAL TRANSPARENT LAYER IN OPTICAL DISC) | ∞ | 0 | – |

FIG.6B

| USED λ (nm) | OPENING SIZE Φ(mm) | REFRACTIVE INDEX OF LENS n1 | REFRACTIVE INDEX OF OPTICAL TRANSPARENT LAYER IN OPTICAL DISC n2 | SURFACE INTERVAL d2 (mm) | SURFACE INTERVAL d3 (mm) |
|---|---|---|---|---|---|
| 405 | 3.02 | 1.558701 | 1.620808 | 0.982361216 | 0.0875 |
| 660 | 2.40 | 1.539642 | 1.578609 | 0.721964692 | 0.6 |
| 785 | 1.83 | 1.536256 | 1.567308 | 0.347388732 | 1.2 |

FIG.6C

TEMPERATURE CHARACTERISTICS OF MATERIAL : $\Delta n/\Delta T(1/°C)$

| WAVELENGTH | 405 | 660 | 785 |
|---|---|---|---|
| LENS MATERIAL | -1.2E-04 | -1.2E-04 | -1.2E-04 |
| OPTICAL TRANSPARENT LAYER IN DISC | -1.0E-04 | -1.0E-04 | -1.0E-04 |

FIG.6D

TEMPERATURE CHARACTERISTICS OF MATERIAL : $\Delta n/\Delta \lambda (1/nm)$

| WAVELENGTH | 405 | 660 | 785 |
|---|---|---|---|
| LENS MATERIAL | -1.4E-04 | -3.2E-05 | -2.9E-05 |
| OPTICAL TRANSPARENT LAYER IN DISC | -4.1E-04 | -6.9E-05 | -3.9E-05 |

FIG.6E

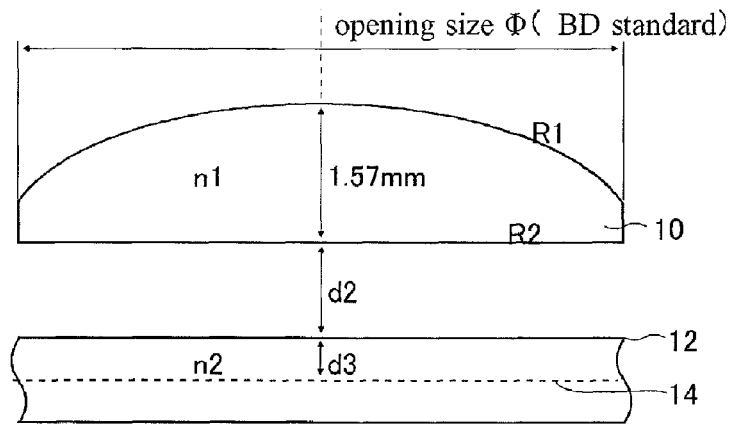

FIG. 7A

OPTICAL PICKUP LENS SURFACE R1

| REGION | F1 | | | | | F2 | | | | |
|---|---|---|---|---|---|---|---|---|---|---|
| ANNULAR ZONE x | 1 | 2 | 3 | 4 | 5 | 6 | 7 | 8 | 9 | 10 |
| USED WAVELENGTH(nm) | 405/660/785 | 405/660/785 | 660/785 | 660/785 | 660/785 | 660/785 | 660/785 | 660/785 | 660/785 | 660/785 |
| DEGREE m OF ANNULAR ZONE STEP OF ANNULAR ZONE x WITH RESPECT TO LENS CENTER / WAVELENGTH (nm) OF DEGREE m | 0/405,660,785 | 8/405 | −2/660 | −3/660 | −4/660 | −5/660 | −6/660 | −7/660 | −8/660 | −9/660 |
| ANNULAR ZONE START RADIUS(mm) | 0 | 0.3456 | 0.5928 | 0.638605 | 0.69564 | 0.739585 | 0.775115 | 0.80597 | 0.83215 | 0.85646 |
| ANNULAR ZONE END RADIUS(mm) | 0.3456 | 0.5928 | 0.638605 | 0.69564 | 0.739585 | 0.775115 | 0.80597 | 0.83215 | 0.85646 | 0.877965 |
| A:0 | 0 | 0.005892583 | −0.002565905 | −0.003909491 | −0.005253112 | −0.006597174 | −0.007939545 | −0.009284241 | −0.010625333 | −0.011971535 |
| R1 | 1.22278623040 | 1.22066455970 | 1.22960685940 | 1.23007820560 | 1.23054920460 | 1.23102110890 | 1.23149187040 | 1.23196322880 | 1.23243350210 | 1.23290571470 |
| K1 | −1.26226388780 | −1.26248314970 | −1.17702171450 | −1.17715130120 | −1.17899821460 | −1.17698876940 | −1.17871364090 | −1.17819735170 | −1.18008002920 | −1.18045774040 |
| A:4 | 0.05601351500 | 0.05630892250 | 0.05369275200 | 0.05364711250 | 0.05370311470 | 0.05350084290 | 0.05356690290 | 0.05346967400 | 0.05353458880 | 0.05349973560 |
| A:6 | 0.00329636150 | 0.00332191470 | 0.00540750420 | 0.00539378710 | 0.00539102590 | 0.00536143890 | 0.00534711020 | 0.00536762700 | 0.00535338190 | 0.00534291630 |
| A:8 | 0.00085487400 | 0.00083946400 | 0.00101859830 | 0.00103128740 | 0.00094197680 | 0.00110671170 | 0.00106591100 | 0.00094873700 | 0.00090757250 | 0.00089610150 |
| A:10 | 0.00280846770 | 0.00290642560 | 0.00070976790 | 0.00067913650 | 0.00086748950 | 0.00047003680 | 0.00057346180 | 0.00085752120 | 0.00095326070 | 0.00098539290 |
| A:12 | −0.01099949810 | −0.01116287090 | −0.00029117610 | −0.00025884520 | −0.00053476620 | 0.00003623200 | −0.00011364650 | −0.00050707510 | −0.00063580610 | −0.00069225050 |
| A:14 | 0.02008087420 | 0.02047528140 | 0.00044668180 | 0.00042700750 | 0.00061552390 | 0.00020562520 | 0.00031517750 | 0.00059656470 | 0.00068434030 | 0.00072978910 |
| A:16 | −0.01428082040 | −0.01450568990 | −0.00005890700 | −0.00005473490 | −0.00010796940 | 0.00001099070 | −0.00002213310 | −0.00010465540 | −0.00012972390 | −0.00014487040 |

| REGION | F2 | | F3 | | F4 | | F5 | | F6 | |
|---|---|---|---|---|---|---|---|---|---|---|
| ANNULAR ZONE x | 11 | 12 | 13 | 14 | 15 | 16 | 17 | 18 | 19 | |
| USED WAVELENGTH(nm) | 660/785 | 660/785 | 660/785 | 405/660 | 405/660 | 405/660 | 405 | 660 | 405 | 0/405 |
| DEGREE m OF ANNULAR ZONE STEP OF ANNULAR ZONE x WITH RESPECT TO LENS CENTER / WAVELENGTH (nm) OF DEGREE m | −10/660 | −11/660 | −12/660 | −12/405 | −15/405 | −18/405 | 0/405 | 0/660 | 0/405 | |
| ANNULAR ZONE START RADIUS(mm) | 0.877965 | 0.8976 | 0.915365 | 0.932 | 0.9713 | 0.9933 | 1.013 | 1.08 | 1.2 | |
| ANNULAR ZONE END RADIUS(mm) | 0.8976 | 0.915365 | 0.932 | 0.9713 | 0.9933 | 1.013 | 1.08 | 1.2 | 1.51 | |
| A:0 | −0.013315451 | −0.014659485 | −0.016016142 | −0.009020436 | −0.011273651 | −0.013526841 | 0 | 0 | 0 | |
| R1 | 1.23337792170 | 1.23384906400 | 1.23432016900 | 1.22603215760 | 1.22684294460 | 1.22765375390 | 1.22050948610 | 1.22829328160 | 1.22050948610 | |
| K1 | −1.18108286700 | −1.18177569260 | −1.18077450370 | −1.24745904930 | −1.25578446150 | −1.26483171650 | −1.26485530930 | −1.19011291850 | −1.26485530930 | |
| A:4 | 0.05348875740 | 0.05347236080 | 0.05334845240 | 0.05457803060 | 0.05503827970 | 0.05554492180 | 0.05550264920 | 0.05304662330 | 0.05550264920 | |
| A:6 | 0.00525953540 | 0.00527168060 | 0.00524783800 | 0.00346615350 | 0.00335963240 | 0.00322449910 | 0.00262143720 | 0.00489872200 | 0.00262143720 | |
| A:8 | 0.00121916440 | 0.00109345200 | 0.00120091300 | 0.00100196150 | 0.00102270420 | 0.00103771460 | 0.00203740700 | 0.00054724710 | 0.00203740700 | |
| A:10 | 0.00016802600 | 0.00048479290 | 0.00020103280 | 0.00030251240 | 0.00028644710 | 0.00027978860 | −0.00134841200 | 0.00098409480 | −0.00134841200 | |
| A:12 | 0.00044328540 | −0.00005789830 | 0.00039367760 | 0.00061323420 | 0.00059596010 | 0.00059120770 | 0.00066038320 | −0.00067335870 | 0.00066038320 | |
| A:14 | −0.00009379770 | 0.00023407230 | −0.00006048470 | 0.00007650303 | 0.00075215920 | 0.00074549340 | 0.00028259160 | 0.00066236490 | 0.00028259160 | |
| A:16 | 0.00009693110 | −0.00000079881 | 0.00008650800 | −0.00015462280 | −0.00015172570 | −0.00015007560 | −0.00008838420 | −0.00011130510 | −0.00008838420 | |

FIG.7B

| OPTICAL PICKUP LENS SURFACE R2 | |
|---|---|
| R2 | −4.840469022 |
| K2 | 4.092271022 |
| $A_24$ | 0.14639724 |
| $A_26$ | −0.211218588 |
| $A_28$ | 0.275635144 |
| $A_210$ | −0.225145786 |
| $A_212$ | 0.109364781 |
| $A_214$ | −0.029228184 |
| $A_216$ | 0.003320628 |

FIG.9

| DEGREE m(DVD) | 1 | 2 | 3 | 4 | 5 | 6 |
|---|---|---|---|---|---|---|
| STEP AMOUNT ON AXIS ($\mu$m) | 1.223 | 2.4461 | 3.6691 | 4.8921 | 6.1152 | 7.3382 |
| RESIDUAL ABERRATION (DVD) | 0 | 0 | 0 | 0 | 0 | 0 |
| RESIDUAL ABERRATION (CD) | −0.165 | −0.329 | −0.494 | 0.342 | 0.1774 | 0.0129 |
| RESIDUAL ABERRATION (BD) | −0.313 | 0.3744 | 0.0616 | −0.251 | 0.4359 | 0.1231 |

OBJECTIVE LENS AND OPTICAL PICK-UP DEVICE USING THE SAME

This application claims priority from Japanese Patent Application Number JP 2011-006664 filed on Jan. 17, 2011, the content of which is incorporated herein by reference in its entirety.

BACKGROUND OF THE INVENTION

1. Field of the Invention

The present invention relates to an objective lens configured to focus multiple laser beams having different wavelengths on corresponding optical discs and also to an optical pickup apparatus including the objective lens.

2. Description of the Related Art

There are multiple standards for optical discs used as information recording media. The laser beam, the recording density, and the thickness of a coating layer for coating an information recording layer, which are used by the standards, are different among the standards. To put it specifically, the optical discs of the compact disc (CD) standard, the digital versatile disc (DVD) standard and the blue-ray disc (BD) standard are currently used.

In order to reduce the number of components, a single objective lens preferably supports the optical discs of these three standards. However, it has not been easy to develop an objective lens compatible in these three standards.

This is because conditions such as a wavelength of a laser beam are different among the standards. As an example, in the BD standard, the wavelength of a laser beam is 405 nm, the thickness of a covering layer that covers an information recording layer of an optical disc is 0.1 mm, and the numerical aperture of a used objective lens is 0.85. In the DVD standard, the wavelength of a laser beam is 650 nm, the thickness of a covering layer for an optical disc is 0.6 mm, and the numerical aperture of an objective lens is 0.60. In the CD standard, the wavelength of a laser beam is 780 nm, the thickness of a covering layer for an optical disc is 1.2 mm, and the numerical aperture of an objective lens is 0.45.

Optical super resolution is one technique of miniaturizing a focus spot without increasing the numerical aperture of the objective lens. An optical pickup apparatus including an objective lens employing the optical super resolution is described in Japanese Patent Application Publications Nos. Hei 9-69237 and 2003-45064, for example.

Japanese Patent Application Publication No. Hei 9-69237 discloses an invention in which a laser beam is partially attenuated to achieve the optical super resolution. Specifically, with reference to FIGS. 1 and 2 in this document, an attenuator 3 is provided in the middle of an optical path of the laser beam, and is used to partially attenuate a laser beam. Thus, a portion of the laser beam incident on a center portion of the objective lens 6 is attenuated and the optical super resolution is achieved.

Japanese Patent Application Publication No. 2003-45064 describes a structure in which the optical super resolution is achieved by the objective lens alone. Specifically, with reference to FIG. 2 in this document, an objective lens 8 includes a first region 8-1 in a center portion of the objective lens 8 and a second region 8-2 outside the first region 8-1, and diffuses a portion of a light beam incident on the first region 8-1. Thus, the portion of the light beam incident on the first region 8-1 is prevented from contributing to spot formation and the optical super resolution is achieved.

SUMMARY OF THE INVENTION

The above-described invention in Japanese Patent Application Publication No. Hei 9-69237 requires the additional part for achieving the optical super resolution besides the objective lens. This may make the structure of the optical pick-up device complex and may increase the costs for the optical pick-up device.

Achieving the optical super resolution with the objective lens alone, Japanese Patent Application Publication No. 2003-45064 avoids an increase in the number of parts, but still does not disclose a structure achieving the optical super resolution with a plurality of laser beams having different wavelengths. Thus, the invention disclosed in the document is difficult to apply to an objective lens that focuses the laser beams of the BD standard, the DVD standard, and the CD standard.

Moreover, in a case of an objective lens supporting three wavelengths to focus the laser beams of the BD standard, the DVD standard, and the CD standard, a long working distance for the CD standard needs to be secured for the following reason. Specifically, an inner perimeter portion of a CD standard optical disc is provided with a stack rib that protrudes about 200 μm from the information recording layer in the thickness direction. The stack rib prevents an information recording surface of the optical disc from contacting another optical disc when a plurality of optical discs are stacked. Meanwhile, an optical pickup apparatus including the objective lens is provided with a collision prevention portion for preventing collision of the objective lens. The collision prevention portion protrudes about 100 μm from a lens surface of the objective lens toward the optical disc side. Accordingly, unless the sufficient working distance is secured, the collision prevention portion of the optical pickup apparatus may collide with the stack rib of the optical disc during operation.

The center portion of the objective lens needs to be thin to achieve the long working distance. Moreover, when the numerical aperture (NA) is set to be as large as about 0.85 to focus the laser beam of the BD standard, the thickness of a peripheral end portion of the objective lens is extremely small. Thus, a mold for resin injection molding for forming the objective lens with these dimensions has such a small cavity gate (inlet) that the injection molding is difficult to perform well.

The present invention is made in view of the above problems. An object of the present invention is to provide an objective lens allowing securing of a long working distance for a laser beam with a long wavelength and having a predetermined thickness or larger at an end portion, and to provide an optical pickup apparatus including the objective lens.

The present invention is An objective lens configured to focus a first laser beam having a first wavelength on an information recording layer of a first optical disc, focus a second laser beam having a second wavelength longer than the first wavelength on an information recording layer of a second optical disc, and focus a third laser beam having a third wavelength longer than the first and second wavelengths on an information recording layer of a third optical disc, the objective lens comprising a plurality of shared regions each configured to focus plural ones of the first laser beam, the second laser beam, and the third laser beam on the information recording layers of the corresponding optical discs, wherein a first invalid region is provided between the plurality of shared regions and is configured to prevent only one of the first laser beam, the second laser beam, and the third laser beam from contributing to spot formation on the information recording layer of the corresponding optical disc.

An optical pickup apparatus of the present invention includes the objective lens having such a structure.

BRIEF DESCRIPTION OF THE DRAWINGS

FIG. 1 are diagrams of an objective lens of a preferred embodiment.

FIG. 2 are diagrams showing how the objective lens of the preferred embodiment focuses a laser beam.

FIG. 3 are graphs showing the aberration of the BD standard when the objective lens of the preferred embodiment is used.

FIG. 4 are graphs showing the aberration of the DVD standard when the objective lens of the preferred embodiment is used.

FIG. 5 are graphs showing the aberration of the CD standard when the objective lens of the preferred embodiment is used.

FIGS. 6A to 6D are tables showing parameters used in determining the characteristics and shape of the objective lens of the preferred embodiment, and FIG. 6E is a diagram for describing the parameters shown in FIG. 6A and the like.

FIG. 7 are tables showing parameters used in determining the shape of the objective lens of the preferred embodiment. FIG. 7A shows parameters defining the shape of a lens surface on which an annular zone is provided. FIG. 7B shows parameters defining a lens surface on which no annular zone is formed.

FIG. 9 is a graph showing relationships between step amounts of the annular zone step included in the objective lens of the preferred embodiment and residual aberrations.

Referring to FIG. 1, an objective lens 10 according to the embodiment will be described. FIG. 1A is a cross-sectional view showing the objective lens 10, and FIG. 1B is a table for describing each region provided in the objective lens 10.

Figures 1A, 1B:
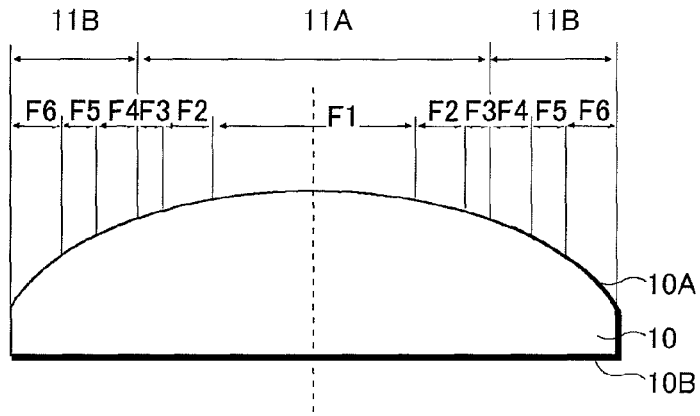
FIG. 1A is a cross-sectional view showing the objective lens.
FIG. 1B is a table for describing each region provided in the objective lens.

The objective lens 10 includes a first lens surface 10A and a second lens surface 10B, and a radiated laser beam passes through the objective lens 10 from the first lens surface 10A to the second lens surface 10B during operation. Moreover, the objective lens 10 is made of plastic or glass.

In the embodiment, the objective lens 10 focuses multiple laser beams having different wavelengths on information recording layers of optical discs. To put it specifically, the objective lens 10 focuses a laser beam of each of the blue-ray disc (BD) standard, the digital versatile disc (DVD) standard and the compact disc (CD) standard on an information recoding layer of a corresponding optical disc.

Here, the wavelength of a laser beam of the BD standard is within the blue-violet (blue) wavelength range of 395 nm to 420 nm (405 nm, for example), and the wavelength of a laser beam of the DVD standard is within the red wavelength range of 645 nm to 675 nm (655 nm, for example). In addition, the wavelength of a laser beam of the CD standard is within the infrared wavelength range of 765 nm to 805 nm (785 nm, for example).

The laser beam incident on the objective lens 10 in this embodiment is infinite light or weak finite light. The infinite light is applied to an optical disc of each standard that includes a single information recording layer. The weak finite light is used in an optical disc of the BD standard or the DVD standard, which includes multiple information recording layers. A description of this matter will be given later in detail.

In the objective lens 10 of the embodiment, the first lens surface 10A is divided into multiple annular zone-shaped regions, and a predetermined laser beam is focused on each of the regions by the refraction effect on an information recording layer of an optical disc. To put it more specifically, the first lens surface 10A of the objective lens 10 is divided into a first region F1 to a sixth region F6 of an annular zone shape from the center toward the outer side of the objective lens 10A.

The objective lens 10 of this embodiment includes a shared region 11A provided in its center portion and an annular zone shaped specialized region 11B surrounding the shared region 11A. The shared region 11A focuses any two or all of laser beams of the BD standard, the DVD standard, and the CD standard on the information recording layers of the corresponding optical discs. The shared region 11A includes a first region F1, a second region F2, and a third region F3 described below. The specialized region 11B focuses the laser beam of the BD standard or the DVD standard on the information recording layer of the corresponding optical disc. The specialized region 11B includes a fourth region F4, a fifth region F5, and a sixth region F6 described below.

The first region F1 is a circular region formed in a center portion of the first lens surface 10A of the objective lens 10 and focuses the laser beams of the BD, the DVD, and the CD standards on the information recording layers of the corresponding optical discs. The first region F1 is formed in the circular shape in a region from the center of the objective lens 10 to 0.5928 mm in radius, and thus is formed into an annular zone partitioned by an annular zone step. Here, an annular zone step having a positive step amount is formed. In the embodiment, an annular zone step amount in the traveling direction of the laser beam incident on the objective lens 10 is denoted as a positive amount. Thus, when an annular zone step having a positive step amount is provided, the objective lens 10 on the outer side of the step is smaller in thickness.

In the first region F1, a single annular zone is formed. To put it specifically, in the first region F1, a circular region and an annular zone portion around the circular region are partitioned by an annular zone step. Here, the number of annular zones to be formed and the width of each of the annular zones are determined in such a way that a spherical aberration caused by a coating layer provided on an optical disc of the DVD standard is corrected by a chromatic aberration caused by the objective lens 10.

A step amount D of the annular zone formed in the first region F1 is calculated by using Formula 1 below.

$$D = m \cdot \lambda / (n-1) \qquad \text{Formula 1}$$

Here, m is a constant, and n is a refractive index of the objective lens while $\lambda$ is a wavelength of the laser beam. Note that, the detailed values used in designing of the actual objective lens 10 will be described later with reference to FIG. 6 and FIG. 7.

In the embodiment, the wavelength (405 nm) of the laser beam of the BD standard is used as the wavelength $\lambda$ used in calculation of the step amount D of the annular zone step formed in the first region F1. To put it more specifically, 8 is employed as the value of m in Formula 1 described above, and 1.558701 is employed as the refractive index n of the objective lens with the wavelength of the BD standard. Thus, the presence or absence of a step has no influence on the practical wavefront aberration of the laser beam of the BD standard.

Meanwhile, a phase shifting on the laser beam of the DVD standard due to the provision of an annular zone step is not an integral multiple of the wavelength. Accordingly, the chromatic aberration occurs in the laser beam of the DVD standard because of the provision of the annular zone step on the first region F1, and the spherical aberration occurring on a coating layer of an optical disc is corrected by the chromatic aberration. Thus, the practical aberration of the laser beam of the DVD standard is reduced in the embodiment.

Another reason for using the wavelength of the BD standard in calculation of the step amount D is that calculation of the annular zone step amount on the basis of the wavelength of the laser beam of the BD standard, which has a short wavelength, makes it possible to reduce the minimum annular zone step amount and also to achieve easier adjustment of the aberration of the laser beam of the DVD standard.

The second region F2 is an annular zone-shaped region (R=0.5928 mm to 0.932 mm) being adjacent to the first region F1 and surrounding the periphery thereof, and forms a spot by focusing each of the laser beams of the DVD standard and the CD standard on an information recording layer of a corresponding optical disc. Here, the point where the laser beams of the DVD standard and the CD standard are focused in the second region F2 is the same as the point where these laser beams are focused in the first region F1. To put it differently, the working distances of the respective regions coincide with each other. The same applies to the regions described below. Note that, the laser beam of the BD standard made incident on this region make no contribution to the spot formation.

Multiple annular zones are provided in the second region F2 and the step amount of an annular zone step provided between adjacent annular zones is calculated from the wavelength of the laser beam of the DVD standard. Here, an annular zone step having a negative step amount is formed. Thus, a cross-sectional shape in which an objective lens on the outer side of the annular zone step is larger in thickness is formed. Here, a chromatic aberration occurs because of the provision of the annular zone step, and a spherical aberration of the laser beam of the CD standard is corrected by the chromatic aberration. Meanwhile, the presence or absence of an annular zone step basically has no influence on the aberration of the laser beam of the DVD standard. Furthermore, this embodiment achieves the optical super resolution by adding a predetermined aberration or lager to the laser beam of the BD standard that transmits through the second region F2. This will be described later with reference to FIG. 9.

In the embodiment, a step is provided between the first region F1 and the second region F2. This is because the position of an outermost circumference portion of the first region F1 where aberrations are optimized with the laser beams of the BD standard and the DVD standard does not coincide with the position of an innermost circumference portion of the second region F2 where aberrations are optimized with the laser beams of the DVD standard and the CD standard. Here, a step is also provided between the second region F2 and the third region F3 for the same reason.

The third region F3 is an annular zone-shaped region (R=0.932 mm to 1.013 mm) being adjacent to the second region F2 and surrounding the periphery thereof, and forms a spot by focusing each of the laser beams of the BD standard and the DVD standard on an information recording layer of a corresponding optical disc. Note that, the laser beam of the CD standard incident on the third region F3 makes no contribution to the spot formation. Likewise, the laser beam of the CD standard incident on an outer side region than the third region F3 makes no contribution to the spot formation either.

Three annular zones are provided in the third region F3 and the step amount of a step formed between adjacent annular zones is calculated from the wavelength of the laser beam of the BD standard as in the case of the first region F1. Accordingly, in this region as well, the spherical aberration of the laser beam of the DVD standard is corrected by the chromatic aberration occurring because of the provision of the annular zone step.

The fourth region F4 is an annular zone-shaped region (R=1.013 mm to 1.08 mm) surrounding the third region F3, and forms a spot by focusing only the laser beam of the BD standard on the information recording layer of the corresponding optical disc. The laser beams of the DVD standard and the CD standard that are radiated on the fourth region F4 make no contribution to the spot formation. Accordingly, the spherical aberrations of the laser beams of the standards other than the BD standard (DVD standard and CD standard) does not have to be taken into consideration, and no annular zone step is thus provided herein. Thus, the fourth region F4 exhibits a continuous surface including no step. The same applies to the fifth region F5 and the sixth region F6 to be described below, where a laser beam of only a specific standard are focused.

The fourth region F4 can reduce the amount of occurrence of aberration to be extremely small because association with the laser beams of the other standards does not have to be taken into consideration. The provision of such a region dedicated for the BD standard improves the aberration of the laser beam of the BD standard on the entire objective lens 10.

Here, the fourth region F4 may be provided with an annular zone to reduce the aberrations of both of the BD standard and the DVD standard as in the case of the third region F3, obviously. However, in order to reduce the aberration of the BD standard efficiently, the fourth region F4 described above is preferably provided.

The fifth region F5 is an annular zone-shaped region (R=1.08 mm to 1.200 mm) surrounding the fourth region F4, and forms a spot by focusing only the laser beam of the DVD standard. The laser beams of the BD standard and the CD standard that are radiated on this region make no contribution to the spot formation. The provision of the fifth region F5, which is a region dedicated for focusing only the laser beam of the DVD standard, improves the aberration of the laser beam of the DVD standard. The reason for the improvement is the same as in the case of the fourth region F4.

Here, the fifth region F5 may be provided with an annular zone to reduce the aberrations of both of the BD standard and the DVD standard as in the case of the third region F3, obviously. However, in order to reduce the aberration of the BD standard efficiently, the fifth region F5 described above is preferably provided. Moreover, both of the fourth region F4 and the fifth region F5 may be provided with an annular zone to reduce the aberrations of both of the BD standard and the DVD standard as in the case of the third region F3. However, in order to reduce the aberrations of the BD standard and the DVD standard efficiently, the fourth region F4 and the fifth region F5 described above are preferably provided.

The sixth region F6 is an annular zone-shaped region (R=1.200 mm to 1.510 mm) surrounding the fifth region F5 and is a region used for focusing only the laser beam of the BD standard as in the case of the fourth region F4. The provision of such a region dedicated for focusing the laser beam of the BD standard in an outermost circumferential portion of the objective lens 10 further reduces the aberration of the laser beam of the BD standard as a whole.

Figure 2A:
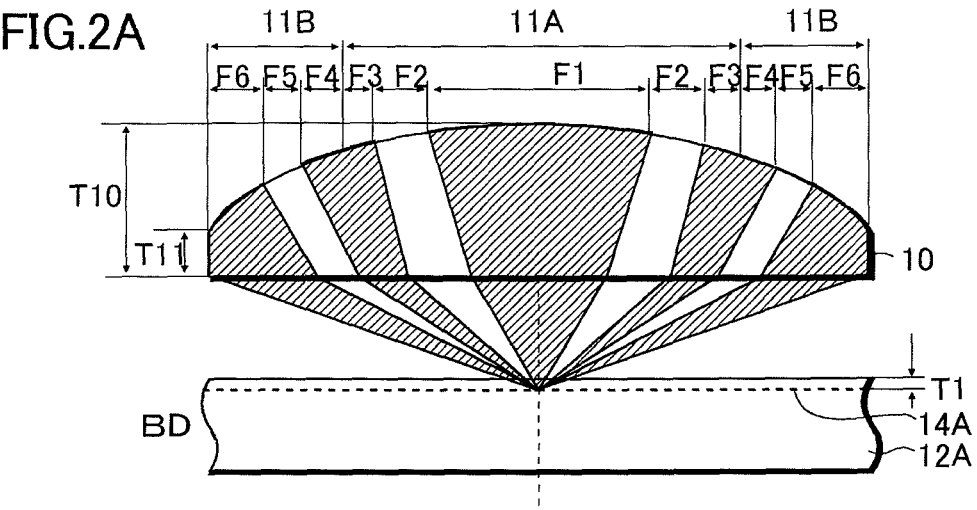
FIG. 2A shows how the laser beam of the BD standard is focused.
Figure 2B:
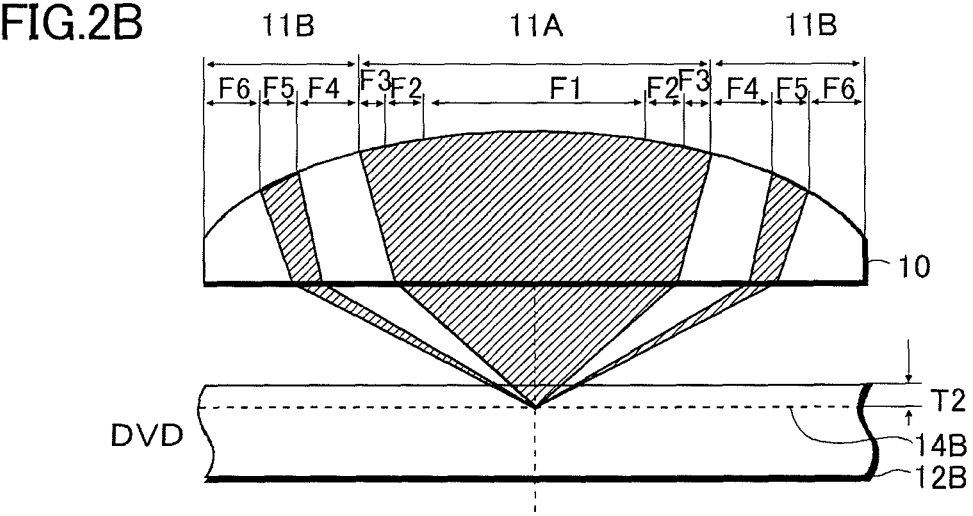
FIG. 2B shows how the laser beam of the DVD standard is focused.
Figure 2C:
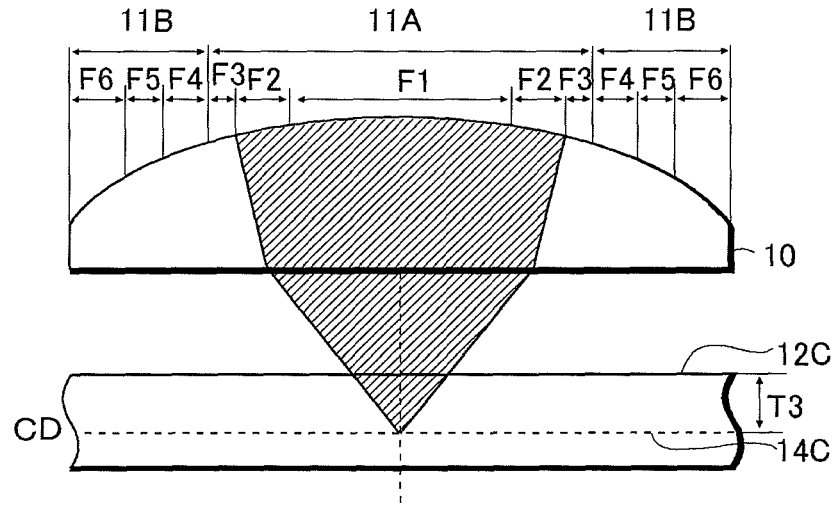
FIG. 2C shows how the laser beam of the CD standard is focused.

Referring to FIG. 2, how the laser beam of each of the standards is focused by the objective lens 10 will be described. Here, FIG. 2A is a cross-sectional view showing how the laser beam of the BD standard is focused on an optical disc 12A by the objective lens 10. FIG. 2B is a cross-sectional view showing the same for the DVD standard, and FIG. 2C is a cross-sectional view showing the same for the CD standard. Here, the portions where a laser beam forming a spot passes through are shown by hatching in each of FIG. 2. Meanwhile, no hatching is provided to the regions making no contribution to the spot formation.

Referring to FIG. 2A, the laser beam of the BD standard emitted from above are focused on an information recording layer 14A of the optical disc 12A of the BD standard by the objective lens 10 and thus forms a spot. Here, a thickness T1 of a coating layer that coats the information recording layer 14A of the optical disc 12A is 0.1 mm, for example.

As apparent from this drawing, the laser beam of the BD standard radiated on the objective lens 10 is not entirely focused on the optical disc 12A, and a portion of the laser beam radiated on the objective lens 10 makes no contribution to the spot formation. To put it specifically, portions of the laser beam radiated on the regions F1, F3, F4 and F6 of the objective lens 10 are focused on the information recording layer 14A of the optical disc 12A. Meanwhile, the second region F2 focuses only the laser beams of the DVD standard and the CD standard, so that the laser beam of the BD standard radiated on this region makes no contribution to the spot formation. Likewise, the fifth region F5 focuses only the laser beam of the DVD standard, so that the laser beam of the BD standard radiated on this region makes no contribution to the spot formation. As described above, a part of the laser beam incident on the objective 10 does not contribute to the spot formation, and thus the optical super resolution is achieved. Moreover, a spot diameter similar to that with the NA of a predetermined value (BD=0.85, DVD=0.60) can be obtained with an NA smaller than the predetermined value and thus, a predetermined thickness is secured at the end portion of the objective lens 10.

Note that, the use efficiency of the laser beam of the BD standard made incident on the objective lens 10 is approximately 40%, for example, and reading of information can be performed well with this use efficiency while writing can be also performed by using a high power laser.

Referring to FIG. 2B, when the laser beam of the DVD standard is radiated on the objective lens 10, portions of the laser beam emitted onto the regions F1, F2, F3 and F5 are focused on an information recording layer 14B of an optical disc 12B and form a spot. Meanwhile, since the fourth region F4 is a region for focusing only the laser beam of the BD standard, the laser beam of the DVD standard radiated on this region makes no contribution to the spot formation. Likewise, the laser beam of the DVD standard radiated on the sixth region F6 for focusing only the laser beam of the BD standard make no contribution to the spot formation. With this configuration, the optical super resolution can be achieved with the laser beam of the DVD standard as well, and the same effect as in the case of the BD standard described above can be obtained.

Note that, the use efficiency of the laser beam of the DVD made incident on the objective lens 10 is approximately 80%, for example, and reading and writing of information can be performed well. In addition, a thickness T2 of a coating layer that coat the information recording layer 14B of the optical disc 12B of the DVD standard is 0.6 mm.

Referring to FIG. 2C, when the laser beam of the CD standard is radiated on the objective lens 10, only portions of the laser beam radiated on the first region F1 and the second region F2 are focused on an information recording layer 14C of an optical disc 12C and form a spot. Meanwhile, the portions of the laser beam made incident on the regions F3, F4, F5 and F6 make no contribution to the spot formation.

Note that, the use efficiency of the laser beam of the CD standard made incident on the objective lens 10 is approximately 90%, for example, and reading and writing of information can be performed without any problem. In addition, a thickness T3 of a coating layer that coats the information recording layer coating layer 14C of the optical disc 12C of the DVD standard is 1.2 mm.

Figure 3A:
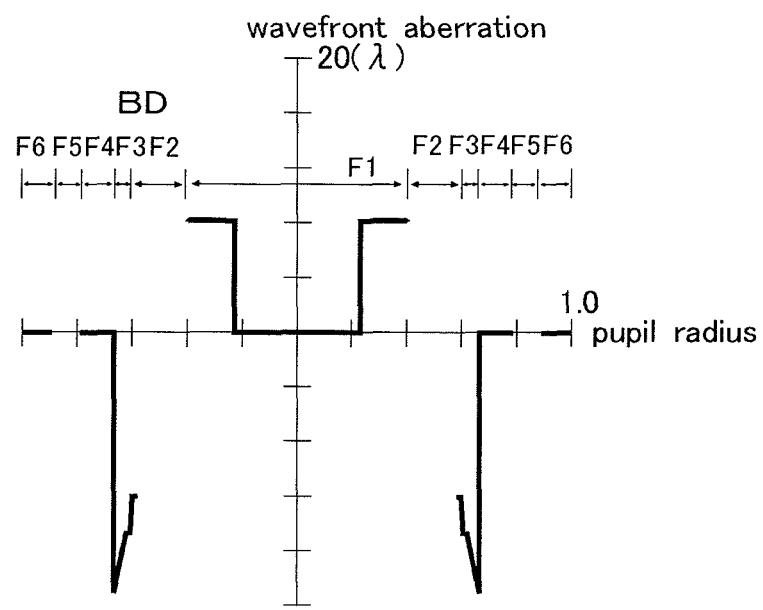
FIG. 3A is a graph showing the aberration calculated from a difference in optical path length.
Figure 3B:
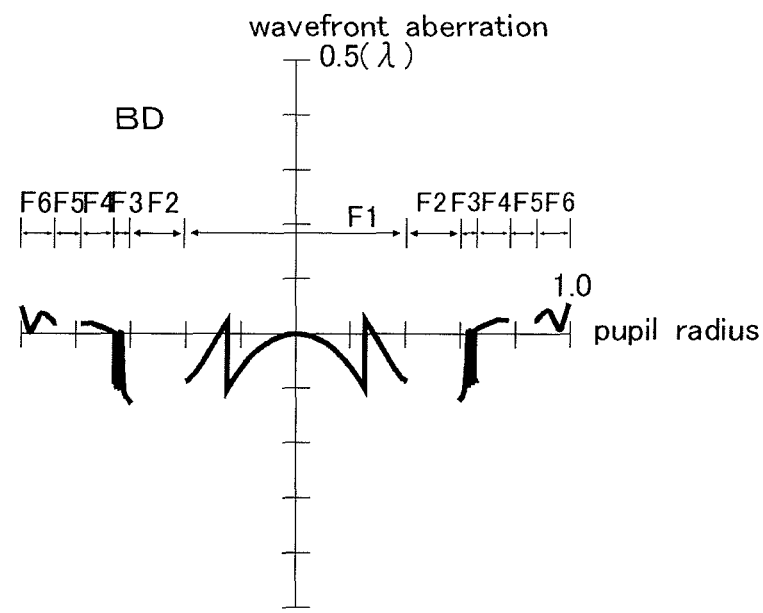
FIG. 3B is a graph showing the aberration occurring actually.
Figure 4A:
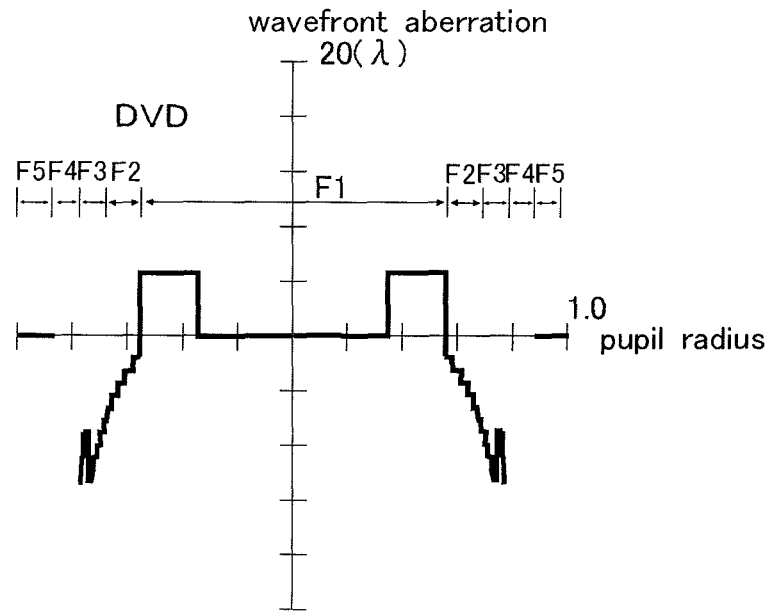
FIG. 4A is a graph showing the aberration calculated from a difference in optical path length.
Figure 4B:
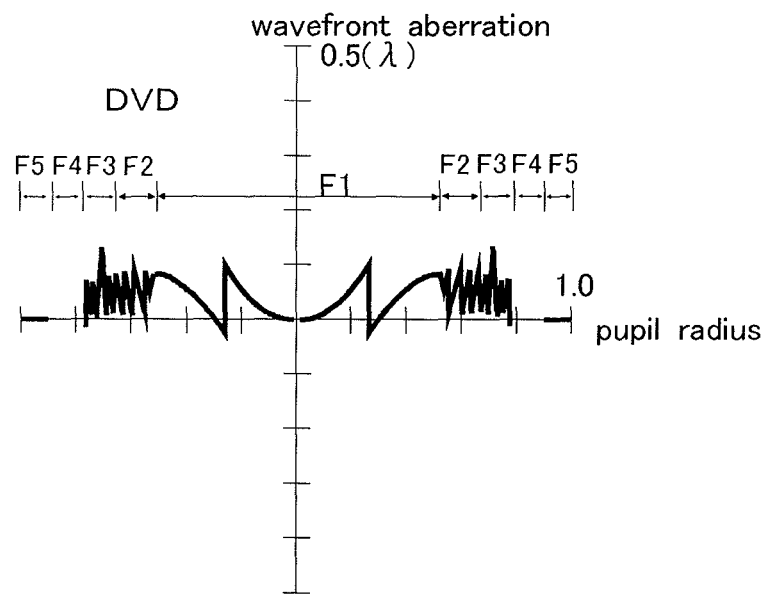
FIG. 4B is a graph showing the aberration occurring actually.
Figure 5A:
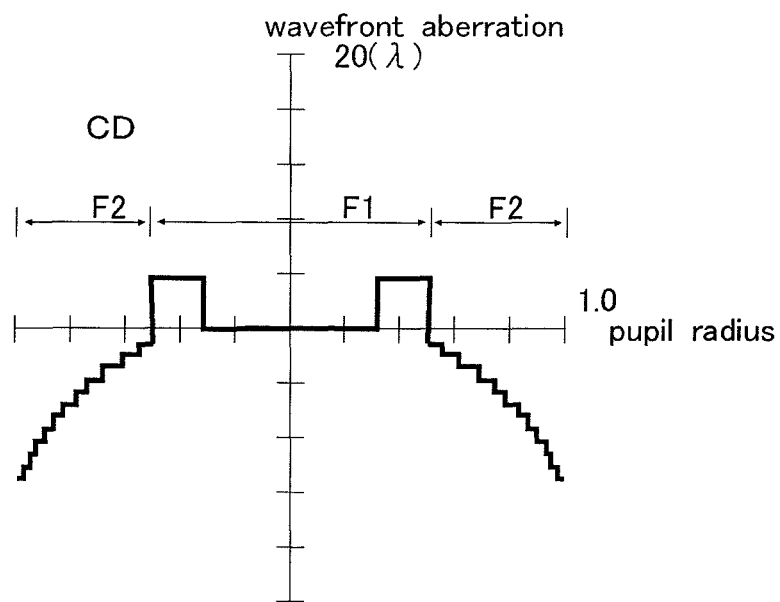
FIG. 5A is a graph showing the aberration calculated from a difference in optical path length.
Figure 5B:
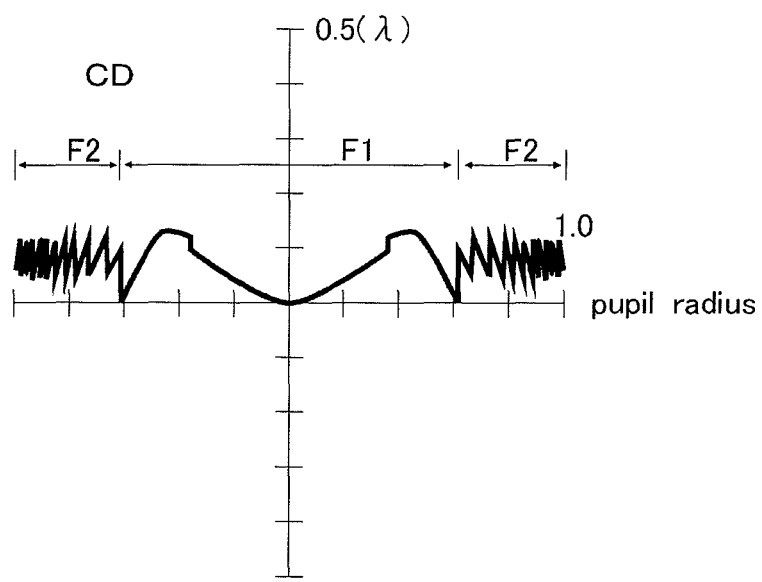
FIG. 5B is a graph showing the aberration occurring actually.

Referring to FIG. 3 to FIG. 6, aberrations occurring on the objective lens having the aforementioned configuration will be described. FIG. 3 show the aberration of the laser beam of the BD standard, and FIG. 4 show the aberration of the laser beam of the DVD standard. In addition, FIG. 5 show the aberration of the laser beam of the CD standard. In the graphs shown in these drawings, the vertical axis shows the amount of aberration and the horizontal axis shows the pupil radius. Moreover, the value of the aberration of the wavelength in accordance with a difference in optical path length is shown in each of FIGS. 3A, 4A and 5A while the value of the aberration practically occurring is shown in each of FIGS. 3B, 4B and 5B by subtracting an integral multiple of a laser beam from the value shown in a corresponding one of FIGS. 3A, 4A and 5A. In addition, the values of the aberrations shown in the drawings are each obtained by adding the aberration occurring on the objective lens and the aberration occurring on a coating layer that coats an information recording layer of an optical disc.

Referring to FIG. 3A, with the laser beam of the BD standard, the aberration changes in accordance with the shape of the curve surface of the objective lens and the annular zone step amount. To put it specifically, in the first region F1, a wavefront aberration of approximately 10λ, occurs in accordance with the step amount of an annular zone step at a position where the annular zone step is provided. However, the step amount of the annular zone step is calculated on the basis of the wavelength of the laser beam of the BD standard, so that the presence of this annular zone step has no large influence on the aberration of the BD standard.

Moreover, no aberration in the second region F2 is shown in this graph. This is because the second region F2 is a region for focusing only the laser beams of the DVD standard and the CD standard, and the laser beam of the BD standard that passes through this region makes no contribution to the spot formation. Thus, the optical super resolution can be achieved with the laser beam of the BD standard and the above described effect is obtained.

In the third region F3, an annular zone step is formed with a negative step amount. Thus, a negative aberration occurs in accordance with the shape of the step.

The fourth region F4 and the sixth region F6 are regions for focusing only the laser beam of the BD standard and thus can be designed in such a way that no aberration occurs in the wavelength of the BD standard. Thus, the amount of aberration occurring in these regions is extremely small.

Meanwhile, no value of the aberration is shown in the fifth region F5. This is because the fifth region F5 is a region for focusing only the laser beam of the DVD standard, and the laser beam of the BD standard radiated on this region makes no contribution to the spot formation.

Referring to FIG. 3B, in the first region F1, the value of a wavefront aberration gradually increases in the negative direction as the position separates from the center portion, and the value increases in the position direction at a portion where the annular zone step is provided. Thereafter, as the position separates from the center portion, the value of the wavefront aberration increases in the negative direction again.

The surface of the first region F1, which is located at the center portion of the objective lens 10, is designed in such a shape that the wavefront aberrations are reduced with the laser beams of the BD standard and the DVD standard. To put it differently, the remaining aberration is shared by the laser beams of the BD standard and the DVD standard by providing the annular zone step. Thus, in the first region F1, the laser beam of the BD standard has an aberration that is not zero, and has a slightly negative aberration.

In addition, the aberration of the BD standard is shifted in the first region F1 in the positive direction at a portion where the annular zone step is provided, and the reasons for this shifting is as follows. First, the annular zone step provided in the first region F1 located in a center position is calculated on the basis of the wavelength of the laser beam of the BD standard, so that the presence or absence of this step basically has no influence on the aberration of the laser beam of the BD standard. However, in order to match the working distances of the first region F1 and the second region F2, the surface shape of the first region F1 is adjusted. As a result, the surface shape of the first region F1, and the step amount of the annular zone step changes. Thus, the aberration of the laser beam of the BD standard is shifted at the position where the annular zone step is provided.

The second region F2 is a region that makes no contribution to the spot formation by the laser beam of the BD standard. Thus, no value of the aberration is shown. The same applies to the fifth region F5.

The third region F3 is a region for focusing the laser beam of the BD standard and the laser beam of the DVD standard. In the third region F3, the annular zone step amount is calculated on the basis of the laser beam of the BD standard, and the surface of the region is formed into such a shape that the aberration is shared by the two standards. As a result, a negative aberration slightly occurs in the third region F3. In addition, as in the case of the first region F1, the surface shape is adjusted in the third region F3 in consideration of the working distance with the other regions. As a result, the value of the aberration is shifted at the position where the annular zone step is provided.

The fourth region F4 and the sixth region F6 are regions for focusing only the laser beam of the BD standard and thus can be each designed in such a shape that the aberration barely occurs in the region. However, a slight aberration occurs in the positive direction in reality. Such an aberration is attributable to that the surfaces of these regions are each formed in such a shape that the working distance of the region matches those of the other regions including the first region F1 and the like, as in the case of the first region F1.

Aberration occurring in the laser beam of the BD standard is extremely small. A RMS (Root Mean Square) wavefront aberration of the BD standard is 0.031 m$\lambda$ RMS if the thickness of the coating layer of the optical disc is 0.0875 mm, which is the thickness between the thickness of the topmost information recording layer and the thickness of the innermost information recording layer. The RMS wavefront aberration not greater than 0.07 m$\lambda$ RMS is considered to be favorable with the Marechal criterion in general. In this embodiment, the RMS wavefront aberration is 0.031 m$\lambda$ RMS if the thickness of the coating layer of the optical disc is 0.0875 mm. Thus, through correcting the spherical aberration by displacing the collimating lens 36 (see FIG. 10) in the optical axis direction in accordance with the information recording layer of the multilayer disc on which the laser beam is to be focused, the RMS wavefront aberration not greater than 0.07 m$\lambda$ RMS considered to be favorable with the Marechal criterion in general can be achieved on both of the topmost and innermost information recording layers of the multilayer discs of the BD standard. Thus, the reading and writing of information can be performed well from and to the optical disc of the BD standard with use of the objective lens of the present invention.

Referring to FIG. 4, the aberration of the laser beam of the DVD standard will be described. In the graphs shown in the drawings, the aberration is shown in a range from the first region F1 to the fifth region F5 for focusing the laser beam of the DVD standard. Note that, since the sixth region F6 is a region for focusing only the laser beam of the BD standard, the laser beam of the DVD standard radiated on this region makes no contribution to the spot formation.

Referring to FIG. 4A, in the case of the laser beam of the DVD standard as well, the aberration is shifted in accordance with the step amount of an annular zone step formed on the objective lens. To put it specifically, the value of a wavefront aberration increases by approximately 5$\lambda$ at the position where the annular zone step is provided. Then, since an annular zone step is formed at the boundary between the first region F1 and the second region F2, the aberration decreases in accordance with the step amount of this step. Furthermore, the value of the aberration changes in a staircase pattern in accordance with the formed annular zone steps in the second region F2. Additionally, in the third region F3, the aberration changes in the position direction while being affected by an annular zone step having a step amount calculated on the basis of the wavelength of the BD standard. Meanwhile, since the fourth region F4 is a region for focusing only the laser beam of the BD standard, the laser beam of the DVD standard radiated on this region makes no contribution to the spot formation. In addition, since the fifth region F5 is a region for focusing only the laser beam of the DVD standard, the aberration occurring in this region is extremely small.

Referring to FIG. 4B, since the surface of the first region F1 is basically designed in such a shape that the aberration of the laser beam of the BD standard is reduced as described above, a spherical aberration occurs in the laser beam of the DVD standard. To put it specifically, the spherical aberration increases in the positive direction as the pupil radius increases. Then, the value of the aberration is shifted in the negative direction and thus corrected at the position where an annular zone step is provided. Moreover, the aberration increases in the position direction in an outward direction in an outer side region from the annular zone step. As described, the reason why the aberration is corrected in the negative direction at the portion of the annular zone step is that the step amount of this annular zone step is calculated on the basis of the wavelength of the laser beam of the BD standard.

Moreover, as obvious from this drawing, the aberration of the laser beam of the DVD standard shows a positive value in a large portion except for the portion where the aberration is shifted in the negative direction because of the annular zone step. In the embodiment, a large portion of the aberration of the laser beam of the BD standard is set to a negative value while a large portion of the aberration of the laser beam of the DVD standard is set to a positive value in the first region F1. Accordingly, the aberration of both of the BD standard and the DVD standard is reduced.

The second region F2 is a region for focusing the laser beams of the DVD standard and the CD standard as described above, and multiple annular zones are provided therein. Then, the annular zone step amount of each of the annular zone steps provided in this region is calculated on the basis of the wavelength of the laser beam of the DVD standard, which is a relatively short wavelength. However, as a result of forming the surface of this region into such a shape that the aberration is shared by the laser beam of the CD standard and the laser beam of the DVD standard, the aberration in the positive direction slightly occurs with the laser beam of the DVD standard in this region as well. Moreover, as a result of adjustment of the surface shape to match its working distance with those of the other regions, the step amount of each of the annular zone steps in this region changes, and the aberration of the laser beam of the DVD standard is shifted at the position where the annular zone step is provided.

In the third region F3, as a result of determining the annular zone step on the basis of the wavelength of the laser beam of the BD standard, the spherical aberration of the laser beam of the DVD standard is shifted by the chromatic aberration and thus corrected as in the case of the first region F1.

Since the fourth region F4 is a region for focusing only the laser beam of the BD standard, the laser beam of the DVD standard made incident on this region make no contribution to the spot formation. Accordingly, no aberration in the fourth region F4 is shown in this graph. Thus, the optical super resolution can be achieved as well with the laser beam of the DVD standard.

Since the fifth region F5 is a region for focusing only the laser beam of the DVD standard, the aberration occurring in this region is extremely small.

Here, the RMS wavefront aberration of the laser beam of the DVD standard is 0.040 mλ RMS if the coating layer of the optical disc has a thickness of 0.6 mm, and this RMS wavefront aberration sufficiently satisfies the above described Marechal criterion.

Referring to FIG. 5, the aberration of the laser beam of the CD standard will be described. Here, the aberration occurring in the first region F1 and the second region F2 is shown. The laser beam of the CD standard radiated on an outer side region from the second region F2 make no contribution to the spot formation, so that the laser beam are not illustrated herein.

Referring to FIG. 5A, the aberration changes in the first region F1 in accordance with an annular zone step calculated on the basis of the wavelength of the laser beam of the BD standard. In addition, the aberration changes in the second region F2 in accordance with annular zone steps calculated on the basis of the wavelength of the laser beam of the DVD standard.

Referring to the effective value of the aberration shown in FIG. 5B, the aberration slightly increases at the position where the annular zone step is provided and its peripheral region in the first region F1, but the aberration occurring in this region is approximately 0.1λ at the maximum.

In the second region F2, the amount of each of the annular zone steps is calculated on the basis of on the wavelength of the laser beam of the DVD standard, so that the spherical aberration of the laser beam of the CD standard is corrected by the chromatic aberration of the objective lens. As a result, the aberration shows such a small value.

Here, the RMS wavefront aberration of the laser beam of the CD standard is 0.034 mλ RMS if the coating layer of the optical disc has a thickness of 1.2 mm, and this RMS wavefront aberration sufficiently satisfies the above described Marechal criterion.

Referring to FIG. 6 and FIG. 7, the specific shape of the objective lens 10 described above will be described. The tables shown in FIG. 6 and FIG. 7 show coefficients indicating the shape and characteristics of the thus realized objective lens 10.

FIG. 6A and FIG. 6B show reflective indices and surface intervals of an optical pickup lens (objective lens) and optical transparent layer (coating layer) in an optical disc with the wave lengths of the BD standard, the DVD standard and the CD standard. Here, an opening size Φ and surface intervals d2 and d3 are as shown in FIG. 6E.

Moreover, FIG. 6C shows the temperature characteristics of a lens material and the transparent layer in the disc with the wavelength of each of the standards. FIG. 6D shows the material wavelength characteristics of the lens material and the transparent layer in the disc.

FIG. 7 show parameters defining the shape of the lens surface. FIG. 7A shows parameters defining the shape of a lens surface R1 (the first lens surface 10A shown in FIG. 1A) where multiple annular zones are provided. FIG. 7B shows parameters defining the shape of a lens surface R2 (the second lens surface 10B shown in FIG. 1A) of the objective lens.

Referring to FIG. 7A, the shape of the lens surface is determined by assigning each parameter shown in the table in Formula 2 below.

[Equation 1]

$$Zx = \frac{h1^2}{R1\left[1 + \sqrt{1 - \frac{(1+K1)h1^2}{R1^2}}\right]} + \quad \text{Formula 2}$$

$$A_10h1^0 + A_14h1^4 + A_16h1^6 + A_18h1^8 +$$
$$A_110h1^{10} + A_112h1^{12} + A_114h1^{14} + A_116h1^{16}\ldots$$

In Formula 2, the positive signs correspond to the area from the surface R1 to the surface R2 shown in FIG. 6E, h1 is the step amount (mm) from the optical axis, and a numerical value of an annular zone x including h (mm) is used for an aspherical coefficient.

The table shown in FIG. 7A shows a wavelength of a laser beam to be focused, a degree m and a wavelength used in calculation of the annular zone step amount by using Formula 1, and an annular zone start radius, an annular zone end radius, and the coefficients used in calculation of the shape for each annular zone. Here, annular zones 1 and 2 correspond to the first region F1 shown in FIG. 1A, annular zones 3 to 13 correspond to the second region F2, annular zones 14 to 16 correspond to the third region F3, an annular zone 17 corresponds to the fourth region F4, an annular zone 18 corresponds to the fifth region F5, and an annular zone 19 corresponds to the sixth region F6.

In addition, the shape of the lens surface R2 is determined by assigning coefficients shown in FIG. 7B in Formula 3 below.

[Equation 2]

$$Zx = \frac{h2^2}{R2\left[1 + \sqrt{1 - \frac{(1+K2)h2^2}{R2^2}}\right]} + A_24h2^4 + A_26h2^6 + \quad \text{Formula 3}$$

$$A_28h2^8 + A_210h2^{10} + A_212h2^{12} + A_214h2^{14} + A_216h2^{16}\ldots$$

In Formula 3, h2 is the step amount (mm) from the optical axis, and a numerical value of the surface R2 is used for an aspherical coefficient.

Figure 8:
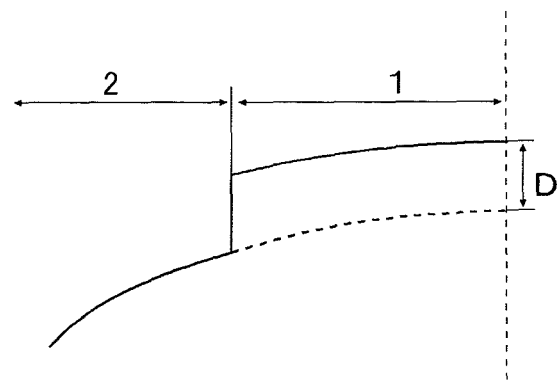
FIG. 8 is a diagram showing an annular zone step included in the objective lens of the preferred embodiment.

Referring to FIG. 8, the step amount of each annular zone is calculated with respect to the center of the objective lens in such a way that Formula 1 above holds true, and the surface shape of each annular zone is optimized thereafter. Accordingly, a step amount D of an annular zone step provided between the annular zone 1 and the annular zone 2 is calculated by assigning m=8, wavelength=405 in Formula 1. The value shows a step amount between the center portion of the lens and a virtually extended surface in a case where the surface of the annular zone 2 is virtually extended and thus widened to the center of the lens.

Note that, referring to the table in FIG. 7A, when the annular zone 3 and the annular zone 4 are compared, the annular zone step of the annular zone 3 is the value obtained by assigning m=−2, wavelength=660 in Formula 1, and the annular zone step of the annular zone 4 is the value obtained by assigning m=−3, wavelength=660 in Formula 1. These values are obtained using the center of the objective lens as the reference as described above. Thus, the step amount of the annular zone step provided between these annular zones is a difference between the step amounts obtained by assigning the respective values in Formula 1.

The objective lens 10 according the embodiment has been described above.

With reference to FIG. 2A, the feature of the present invention is that a portion of the laser beam incident on the shared region of the objective lens 10 does not contribute to the spot formation so that the optical super resolution is achieved.

Specifically, as described above, a long working distance for the CD standard needs to be secured to prevent the optical pickup apparatus from colliding with the optical disc during operation. To achieve this, with reference to FIG. 2A, the thickness of the center portion (the first region F1 and the second region F2) of the objective lens 10 needs to be small. However, this makes the thickness T11 of the end portion of the objective lens 10 extremely small, and thus the objective lens is difficult to form with the injection molding. The thickness T11 of the end portion of the objective lens 10 is small because this region is shared by the BD standard, the DVD standard, and the CD standard and the numerical aperture (0.78) of the BD standard is too large for the numerical aperture (0.47) of the CD standard.

To solve this problem, this embodiment achieves the optical super resolution with a portion of the shared region 11A serving as a shared region that does not focus the laser beam of the BD standard. Specifically, the first region F1, the second region F2, and the third region F3 provided in the center portion of the objective lens 10 are each a shared region that focuses a plurality of laser beams of different standards. Portions of the laser beam of the BD standard incident on the first region F1 and the third region F3 are focused on the information recording layer 14A of the optical disc 12A to contribute to the spot formation, whereas a portion of the laser beam of the BD standard incident on the second region F2 does not contribute to the spot formation. In other words, the second region F2 serves as an invalid region that does not contribute to the spot formation of the laser beam of the BD standard. Thus, the optical super resolution is achieved and the thickness T11 of the end portion can be made equal to or larger than 0.274 mm even when the thickness T10 of the center portion of the objective lens 10 is made small to provide the long working distance for the CD standard. Thus, the gate width of the mold provided at this position for the injection molding can be made large. Accordingly, the injection molding can be performed well.

To prevent the portion of the laser beam of the BD standard incident on the second region from contributing to the spot formation, in this embodiment, the step amount of the annular zone step formed in the second region F2 is adjusted to a predetermined level. Specifically, the step amount is calculated on the basis of the wavelength of the DVD standard instead of the BD standard. Thus, the aberration of 0.3λ or larger occurs in the laser beam of the BD standard transmitted through the second region F2. Thus, this portion of the laser beam of the BD does not contribute to the spot formation. Meanwhile, the aberration occurring in the laser beams of the DVD standard and the CD standard is described above with reference to the graph and is a value (e.g., smaller than 0.3λ) to contribute to the spot formation well.

Also, in the specialized region 11B provided on the outer side of the objective lens 10, the portion of the laser beam of the BD standard radiated on the fifth region F5 does not contribute to the spot formation. Thus, the fifth region F5 serves as the invalid region. This is achieved with the surface shape of the lens at the fifth region F5 being a curved surface shape for appropriately focusing the laser beam of the DVD standard only. Thus, the effect obtained by the optical super resolution is further improved. Accordingly, with the numerical aperture being 0.78, an applied numerical aperture of the BD standard in a case where the optical super resolution is not employed can correspond to the numerical aperture 0.85.

With reference to FIG. 2B, in this embodiment, an invalid region for the laser beam of the DVD standard is also formed around the center portion, and thus the optical super resolution is achieved. Specifically, the fourth region F4 as the specialized region that only focuses the laser beam of the BD standard is the invalid region that does not contribute to the spot formation of the laser beam of the DVD standard. Thus, the effect of the optical super resolution is further improved.

With reference to FIG. 2C, the CD standard requires a small numerical aperture, and thus does not require the optical super resolution. Therefore, only the first region F1 and the second region F2 of the objective lens 10 contribute to the spot formation of the laser beam of the CD standard. The regions (the third region F3 to the sixth region F6) more on the outer side than the first region F1 and the second region F2 are invalid regions that do not contribute to the spot formation of the laser beam of the CD standard.

The optical super resolution with the BD standard is achieved by setting the step amount of the annular zone step formed in the second region F2 to a predetermined amount. This is described with reference to FIG. 9. FIG. 9 shows residual aberrations occurring in the laser beams of the standards when the annular zone step amount is calculated with the degree m from 1 to 6 on the basis of the wavelength of the DVD standard.

Conditions for calculating the residual aberrations shown in this graph are described. The wavelength of the laser beam of the DVD standard is 660 nm and refractive index of the objective lens for the wavelength of the DVD standard is 1.539642. The step amount (axial step amount in a case where the annular zone is virtually extended toward the center) for a single wavelength of the DVD standard is 1.223003 μm.

First of all, the annular zone step amount D in the second region F2 is determined with Formula 1 on the basis of the wavelength of the DVD standard. The reason why the wavelength of the BD standard is not used for calculating the annular zone step amount D is as follows. Specifically, when the wavelength of the BD standard is used for calculating the annular zone step amount, the value of the aberration occurring in the BD standard is small and a portion of the laser beam of the BD standard incident on the second region F2 contributes to the spot formation. Thus, the second region F2 does not serve as the invalid region for the BD standard. When the wavelength of the CD standard is used for calculating the annular zone step amount, there are not much alternatives of the degree m (see Formula 1) within a range of a predetermined annular zone step amount. Thus, the degree m for causing an optimum residual aberration is difficult to select.

With reference to this graph, while the annular zone step amount is within a range of 7 μm, any of the degrees 1 to 6 can be employed, the optimum degree m is 1. This is because, to begin with, a value (absolute value) of the residual aberration occurring in the laser beam of the CD standard is smaller than $0.3\lambda$, (−0.16451) and thus, a portion of the laser beam of the CD standard transmitted through the second region F2 is focused well on the information recording layer of the optical disc. Meanwhile, a value of the residual aberration occurring in the laser beam of the BD standard is equal to or larger than $0.3\lambda$ (0.31282) and thus, a portion of the laser beam of the BD standard incident on the second region F2 does not contribute to the spot formation. Note that, since the annular zone step amount is calculated on the basis of the wavelength of the DVD standard, the residual aberration does not basically occur in the laser beam of the DVD standard. Thus, the second region F2 serves as the invalid region for the laser beam of the BD standard. Accordingly, the optical super resolution is achieved.

Note that, the annular zone step amount in the first region F1 is calculated on the basis of the wavelength of the BD standard and the degree m is 8. Thus, in the first region F1, the aberrations in the three standards (BD, DVD, and CD) are smaller than $0.3\lambda$ and thus, the laser beams of the standards are focused well. In the third region F3, the annular zone step amount in the third region F3 is calculated on the basis of the wavelength of the BD standard and the degree m is 3. Thus, in the third region F3, the aberrations in the BD standard and the DVD standard are smaller than $0.3\lambda$ and thus, the laser beams of the standards are focused. Since the aberration of the CD standard is equal to or larger than $0.3\lambda$, a portion of the laser beam of the CD standard transmitted through the third region F3 does not contribute to the spot formation.

As described above, in this embodiment, the value of the residual aberration occurring in the laser beam to be focused is set to be smaller than $0.3\lambda$ to improve the accuracy of the reading and writing. This value can be changed and, for example, a value of the residual aberration is more preferably smaller than $0.25\lambda$, and is particularly preferably smaller than $0.20\lambda$. With such values, the accuracy of the reading and writing is further improved.

In the above description, the value of the residual aberration occurring in the laser beam not contributing to the spot formation is set to be equal to or larger than $0.3\lambda$ to achieve the optical super resolution. This value can be changed and, for example, a value of the residual aberration is more preferably equal to or larger than $0.35\lambda$, and is particularly preferably equal to or larger than $0.40\lambda$. With such values, the optical super resolution can be more surely achieved.

With reference to FIG. 2A, in the above description, a portion of the laser beam of the BD standard transmitted through the second region F2 does not contribute to the spot formation and thus the optical super resolution is achieved. Alternatively, the optical super resolution can be also achieved by preventing the laser beam of another standard (e.g., second laser beam) from contributing to the spot formation.

In this embodiment, the annular zone step is provided to correct the aberration. The step amount of the annular zone step can be selected within a certain range. Specifically, to obtain the step amount D in the first region F1, the value of the wavelength ($\lambda$) to be assigned in Formula 1 described above does not have to be necessarily 405 nm of the BD standard, and may be changed within a range of 395 nm to 420 nm, for example. If the wavelength used in calculation of the step amount is slightly changed in the manner described above, the aberration occurring in the laser beam of the DVD standard or the CD standard other than the BD standard is improved. The same applies to the second region F2 and the third region F3, and the wavelength used for calculating the step amount is changeable within a range of 645 nm to 675 nm in the case of the DVD standard.

Further, in this embodiment, the laser beams of the standards that are infinite light or weak finite light are focused on the objective lens 10. Here, in the case of weak finite light, the objective lens is designed in such a way that the minimum aberration when infinite light enters the objective lens designed in accordance with weak finite light does not exceed the Marechal criterion.

Infinite light is used when reading or writing of information is performed on an optical disc of each of the standards that includes a single information recording layer. In case of an optical disc having a single information recording layer, stable reading and writing can be performed by using infinite light because a coating layer that coats the information recording layer has a constant thickness. Infinite light is generated by installing a collimating lens in an optical path through which laser beams pass in an optical pickup apparatus.

Weak finite light is used in focusing laser beams on layers of an optical disc of the BD standard or the DVD standard that include multiple information recording layers. To put it specifically, in a case of an optical disc of the BD standard that includes two information recording layers, the thickness of a coating layer for coating the information recording layer closer to the surface of the optical disc is 0.075 mm while the thickness of a coating layer for coating the information recording layer distant from the surface thereof is 0.100 mm. In this case, the objective lens is designed in such a way that the focal point is 0.0875 mm, which corresponds to the thickness at the intermediate position of the coating layers of the optical disc using two information recording layers, while the laser beams to be used are set to infinite. Then, the incident laser beams are set to weak finite light, thereby, the laser beams are focused on the information recording layers for performing reading or writing, and a spot is formed.

In addition, in a case of an optical disc of the BD standard that includes four information recoding layers, the topmost information recoding layer is coated by a coating layer having a thickness of 0.050 mm, while the deepest information recoding layer is coated by a coating layer having a thickness of 0.105 mm. In this case, the objective lens is designed in such a way that the laser beam of infinite light is focused on an information recording layer coated by a coating layer having a thickness of 0.0775 mm, which corresponds to the intermediate value between both of the aforementioned coating layers. Then, when the incident laser beam becomes weak finite light, the laser beam is focused on the desired information recoding layer.

The aforementioned weak finite light is created by moving the collimating lens installed in the optical path of the laser beams. To put it another way, the weak finite light shows divergent light and convergent light incident on the objective lens at an angle required for displacing the focal point of the objective lens on each of the information recording layers of the optical discs when infinite light is emitted, the focal point being set to a thickness at the intermediate position between the information recording layers of a multilayer disc.

Figure 10:
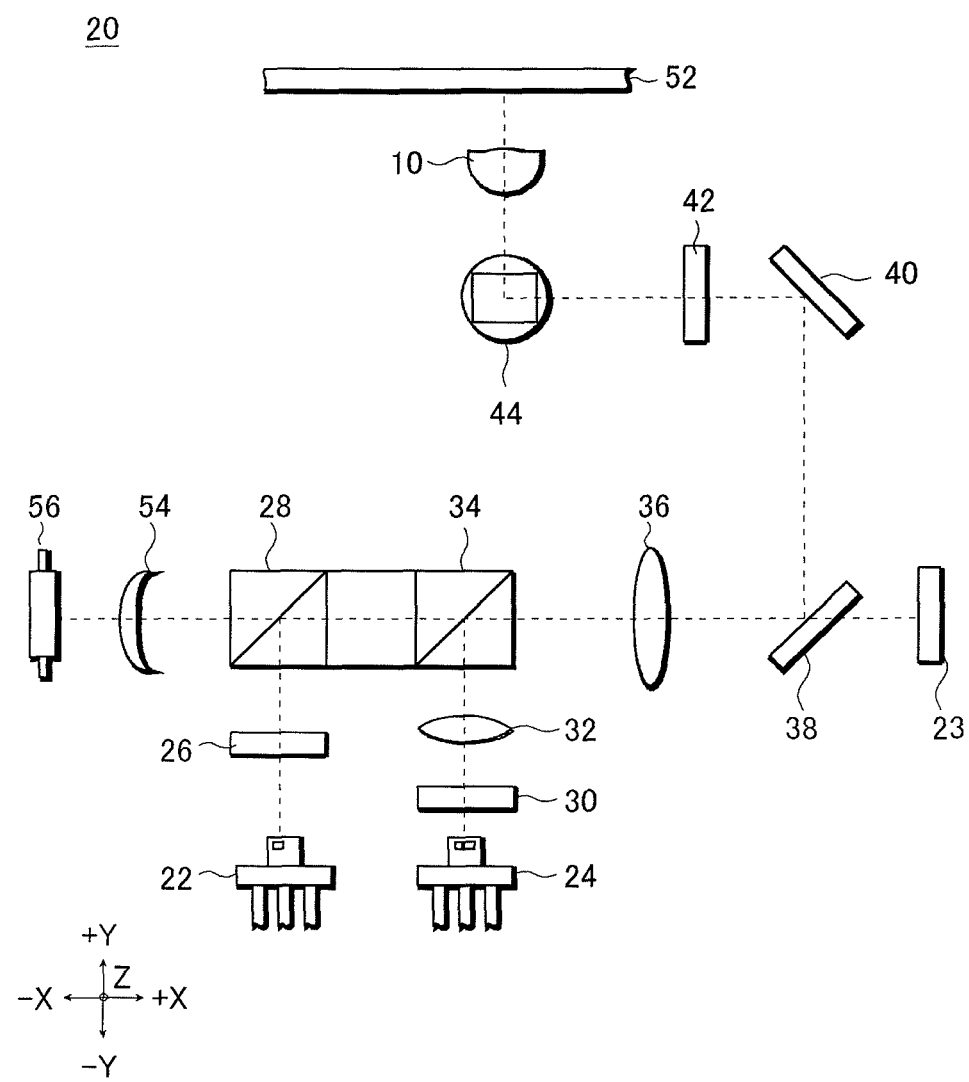
FIG. 10 is a diagram showing an optical pickup apparatus including the objective lens of the preferred embodiment.

Referring to FIG. 10, a description will be given of a configuration of an optical pickup apparatus 20 including the objective lens 10 having the configuration described above.

The optical pickup apparatus 20 has a function to focus the laser beam of the BD standard, the DVD standard or the CD standard on an information recording layer of an optical disc 52, then to receive reflected light from the information recording layer and to convert the received light into electric signals. With this function, the optical pickup apparatus 20 performs reading and writing of information from and to the optical disc 52 of each of the standards.

A description will be given of elements included in the optical pickup apparatus 20 of the embodiment.

A laser device 22 emits the laser beam of the wavelength of the BD standard. A laser device 24 emits the laser beams of the wavelengths of the DVD standard and the CD standard.

A diffraction grating 26 is placed between the laser device 22 and a composite prism 28, and the laser beam of the BD standard is made incident on the diffraction grating 26. In addition, the diffraction grating 26 includes: a diffraction grating configured to separate the incident laser beam into 0th order light, +1st order diffracted light, and −1st order diffracted light; and a half-wavelength plate configured to convert the incident laser beam into a beam linearly-polarized in an S direction with respect to a polarization surface of the composite prism 28. Likewise, a diffraction grating 30 is placed between the laser device 24 and a composite prism 34 and includes a diffraction grating and a half-wavelength plate. Note that, the diffraction grating 30 is configured to convert the laser beams of the DVD standard and the CD standard into the beam linearly-polarized in the S direction with respect to a polarization surface of the composite prism 34.

A divergent lens 32 is placed between the diffraction grating 30 and the composite prism 34 and is configured to adjust a spread angle of the laser beam diffracted by the diffraction grating 30.

The composite prism 28 incorporates a polarization surface that has wavelength selectivity and polarization selectivity and thus functions as a polarization splitter for the laser beam of the BD standard and as a total transmission prism for the laser beams of the DVD standard and the CD standard. To put it specifically, the laser beam of the BD standard as the beam linearly-polarized in the S direction is reflected to a +X direction in FIG. 9 by the polarization surface. Meanwhile, the laser beam (returning beam) reflected by the optical disc 52 is a beam linearly-polarized in a P direction and passes through the polarization surface in a −X direction in FIG. 9.

The composite prism 34 incorporates a polarization surface that has wavelength selectivity and polarization selectivity and thus functions as a polarization splitter for the laser beams of the DVD standard and the CD standard and as a total transmission prism for the laser beam of the BD standard. To put it specifically, the composite prism 34 adjusts the reflectivity of the laser beams of the DVD standard and the CD standard and thereby adjusts the light amount of a second laser beams to be guided to a PDIC 56. Then, a large portion of the laser beams of the DVD standard and the CD standard, which are the beams linearly-polarized in the S direction, is reflected to the +X direction in FIG. 9 by the polarization plane. Meanwhile, the laser beams of the DVD standard and the CD standard reflected by the optical disc is the beam linearly-polarized in the P direction and certain percentage thereof pass through the polarization surface in the −X direction in FIG. 9.

A collimating lens 36 converts the laser beams of the BD standard, the DVD standard and the CD standard into infinite light. The collimating lens 36 moves in a direction parallel to an optical path (optical axis) shown by a dotted line (±X direction in the drawing). In addition, the collimating lens 36 optimizes the optical magnification in accordance with the laser beam of each of the standards and thereby suppresses occurrence of interlayer stray light or interlayer crosstalk. In addition, the laser beams can be converted into weak finite light by moving the collimating lens 36.

A reflective mirror 38 has wavelength selectivity and polarization selectivity. To put it specifically, the reflective mirror 38 transmits a part of the laser beam in the outward path to be radiated on an FMD 23.

The FMD 23 receives the laser beam on the outward path that has passed through the reflective mirror 38, and outputs a signal indicating the light amount of the received laser beam. Accordingly, the laser devices 22 and 24 are controlled on the basis of the output of the FMD 23.

A reflective mirror 40 totally reflects the laser beam of each of the standards on the outward path to the −X direction in FIG. 9. Likewise, the reflective mirror 40 totally reflects the laser beam (returning beam) on the returning path, which has been reflected by the optical disc 52, to a −Y direction in FIG. 9.

A quarter-wavelength plate 42 causes a phase difference in the incident laser beam and converts the laser beam of each of the standards as the beam linearly-polarized in the S direction into a circularly-polarized beam. Meanwhile, the laser beam reflected by the optical disc 52 (returning beam) is converted into the laser beam as the beam linearly-polarized in the P direction after passing through the quarter-wavelength plate 42 again.

A reflecting mirror 44 reflects the laser beam of each of the standards to a +Y direction in FIG. 9.

The objective lens 10 focuses the laser beams of the BD standard, the DVD standard and the CD standard that are reflected by the reflecting mirror 44 on an information recording layer of the optical disc 52.

An anamorphic lens 54 is placed between the composite prism 28 and the PDIC 56, and the laser beam (returning beam) of each of the standards, which is reflected by the optical disc 52, passes through the anamorphic lens 54. The anamorphic lens 54 then gives astigmatism for focus servo to the laser beam passing therethrough so as to allow the laser beam of each of the standards to be processed by the single FDIC 56.

The PDIC 56 is a photodetector in which a photodiode integrated circuit element for detecting signals is embedded and receives the laser beam of each of the standards on a light receiving region on a single surface and then outputs a detection signal including an information signal component by photoelectric conversion. Furthermore, the PDIC 56 outputs a detection signal including a servo signal component used in focus servo and tracking servo.

Next, a description will be given of optical paths of the laser beams of the DVD standard and the CD standard.

First, the laser beam emitted from the laser device 24 is made incident on the composite prism 34 after being converted into the beam linearly-polarized in the S direction by the diffraction grating 30 and being adjusted to have a predetermined spread angle by the divergent lens 32. Thereafter, the laser beam is reflected by the polarization surface of the composite prism 34 and then reflected by the reflective mirror 38 after being converted into infinite light by the collimating lens 36. Moreover, a part of the laser beam passes through the reflective mirror 38 to be radiated on the FMD 23. Thus, the output of the laser device 24 is controlled on the basis of the output of the FMD 23.

The laser beam reflected by the reflection mirror 38 is totally reflected by the reflection mirror 40 and then converted from the beam linearly-polarized in the S direction into a circularly-polarized beam after passing through the quarter-wavelength plate 42. Thereafter, the laser beam as the circularly-polarized beam is reflected by the reflecting mirror 44 and then focused on an information recording layer of the optical disc 52 by the objective lens 10.

Next, the laser beam (returning beam) reflected by the information recording layer of the optical disc 52 passes through the objective lens 10 and are converted from the circularly-polarized beam into the laser beam as the beam linearly-polarized in the P direction by passing through the quarter-wavelength plate 42 after being reflected by the reflecting mirror 44. Then, the laser beam passes through the collimating lens 36, and the composite prisms 34 and 28 after being reflected by the reflective mirrors 40 and 38. Thereafter, astigmatism for focus error detection is given to the laser beam by the anamorphic lens 54. The laser beam is then received by the light receiving region of the PDIC 56 and then converted into a detection signal by photoelectric conversion.

Next, a description will be given of optical paths of the laser beam of the BD standard.

First, the laser beam emitted from the laser device 22 is made incident on the composite prism 28 after being converted into the beam circularly-polarized in the S direction by the diffraction grating 26. Thereafter, the laser beam is totally reflected by the polarization surface of the composite prism 28 and then totally passes through the composite prism 34. Thereafter, the laser beam is converted into infinite light by the collimating lens 36, and then, a large portion of the laser beam is reflected by the reflection mirror 38, and the remaining portion thereof passes through the reflective mirror 38. The laser beam that has passed through the reflective mirror 38 is detected by the FMD 23. Thus, the output of the laser device 22 is adjusted on the basis of the output of the FMD 23 in the same manner described above.

The laser beam reflected by the reflective mirror 38 is totally reflected by the reflective mirror 40 and then converted from the beam linearly-polarized in the S direction into the circularly-polarized beam after passing through the quarter-wavelength plate 42. Thereafter, the laser beam as the circularly-polarized light is reflected by the reflecting mirror 44 and then focused on the information recording layer of the optical disc 52 by the objective lens 10.

Next, the laser beam (returning light) reflected by the information recording layer of the optical disc 52 passes through the objective lens 10 and is converted from the circularly-polarized beam into the laser beam as the beam linearly-polarized in the P direction by passing through the quarter-wavelength plate 42 after being reflected by the reflecting mirror 44. Then, the laser beam passes through the collimating lens 36, the composite prisms 34 and 28 after being reflected by the reflective mirrors 40 and 38. Thereafter, astigmatism is given to the laser beam by the anamorphic lens 54. The laser beam is then received by the light receiving region of the PDIC 56. Then, a detection signal formed by photoelectric conversion is outputted.

The optical paths of the laser beams of the embodiment have been described above. As described in Description of the Related Art section, in the optical pickup apparatus 20, the objective lens 10 provides a long working distance so that the stack rib including the optical disc 52 (optical disc of the CD standard) is prevented from colliding with the collision prevention portion protruding upward to protect the objective lens 10. To achieve this, the center portion of the objective lens 10 needs to be thin, and the optical super resolution is employed so that the injection molding can be performed well even in this case. Details of the optical super resolution are described with reference to FIG. 2 and the like.

Here, it is also possible to perform LightScribe by using the objective lens and the optical pickup described above. LightScribe is a technique to write character information or picture information on a surface opposite to the recording surface of an optical disc by laser etching. Since the objective lens of this embodiment has a high use efficiency of the laser beam, LightScribe can be performed efficiently.

In the objective lens of the present invention, the first shared region that focuses the first laser beam, the second laser beam, and the third laser beam, the second shared region that focuses the second laser beam and the third laser beam, and the third shared region that focuses the first laser beam and the second laser beam are provided in this order from the center portion. The optical super resolution with the first laser beam having the shortest wavelength is achieved by preventing a portion of the first laser beam transmitted through the second shared region from contributing to the spot formation. Thus, even when the thickness of the objective lens at the center portion is small, a predetermined thickness or larger can be secured at the end portion. Thus, the objective lens can be formed well by the injection molding.

What is claimed is:

1. An objective lens configured to focus a first laser beam having a first wavelength on an information recording layer of a first optical disc, focus a second laser beam having a second wavelength longer than the first wavelength on an information recording layer of a second optical disc, and focus a third laser beam having a third wavelength longer than the first and second wavelengths on an information recording layer of a third optical disc, the objective lens comprising:
   a plurality of shared regions each configured to focus plural ones of the first laser beam, the second laser beam, and the third laser beam on the information recording layers of the corresponding optical discs, wherein
   a first invalid region is provided in between two of the plurality of shared regions and is configured to prevent only one of the first laser beam, the second laser beam, and the third laser beam from contributing to spot formation on the information recording layer of the corresponding optical disc.

2. The objective lens according to claim 1, wherein
the plurality of shared regions includes
   a first shared region that is a circular region provided in a center portion of the objective lens and configured to focus the first laser beam, the second laser beam, and the third laser beam on the information recording layers of the corresponding optical discs,
   a second shared region that is an annular zone shaped region provided around the first shared region and configured to focus the second laser beam and the third laser beam on the information recording layers of the corresponding optical discs, and
   a third shared region that is an annular zone shaped region provided around the second shared region and configured to focus the first laser beam and the second laser beam on the information recording layers of the corresponding optical discs, and
the second shared region serves as the first invalid region for the first laser beam by preventing a portion of the first laser beam incident on the second shared region from contributing to the spot formation on the information recording layer of the first optical disc.

3. The objective lens according to claim 2, wherein
an annular zone step is provided in the second shared region, and
a step amount of the annular zone step is set so that an aberration occurring in the first laser beam is equal to or larger than 0.3λ and an aberration occurring in each of the second laser beam and the third laser beam is smaller than 0.3λ.

4. The objective lens according to claim 3, wherein
a step amount D of the annular zone step provided in each of the plurality of shared regions is D=m·λ/(n−1), where m denotes a certain degree, λ denotes the wavelength of a laser beam, and n denotes the refractive index of the objective lens, and
the degree m in the second shared region is set so that the aberration occurring in each of the second laser beam and the third laser beam is smaller than 0.3λ, and the aberration occurring in the first laser beam is equal to or larger than 0.3λ.

5. The objective lens according to claim 2, further comprising a first specialized region that is provided outside the third shared region and is configured to focus only the first laser beam on the information recording layer of the first optical disc, wherein
a second invalid region configured to prevent a portion of the first laser beam incident thereon from contributing to the spot formation on the information recording layer of the first optical disc is provided between the third shared region and the first specialized region.

6. The objective lens according to claim 2, further comprising a second specialized region that is provided outside the third shared region and is configured to focus only the second laser beam on the information recording layer of the second optical disc, wherein
a third invalid region configured to prevent a portion of the second laser beam incident thereon from contributing to the spot formation on the information recording layer of the second optical disc is provided between the third shared region and the second specialized region.

7. The objective lens according to claim 4, wherein the degree m in the third shared region is set so that the aberration occurring in the third laser beam is equal to or larger than 0.3λ.

8. An optical pickup apparatus comprising the objective lens according to claim 1.

* * * * *